US011108177B2

(12) United States Patent
Chen et al.

(10) Patent No.: US 11,108,177 B2
(45) Date of Patent: Aug. 31, 2021

(54) CARD CONNECTOR WITH FRAME-LIKE TONGUE FOR PROTECTING CANTILEVERED CONTACTS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Zhi-Jian Chen, Kunshan (CN); Ning Tian, Kunshan (CN); Kun Huang, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 16/831,760

(22) Filed: Mar. 26, 2020

(65) Prior Publication Data

US 2020/0313325 A1 Oct. 1, 2020

(30) Foreign Application Priority Data

Mar. 26, 2019 (CN) ......................... 201910230041.2

(51) Int. Cl.
*H01R 12/72* (2011.01)
*H01R 12/70* (2011.01)
(Continued)

(52) U.S. Cl.
CPC ....... *H01R 12/721* (2013.01); *H01R 12/7005* (2013.01); *H01R 13/405* (2013.01); *H01R 13/6471* (2013.01); *H01R 13/6581* (2013.01)

(58) Field of Classification Search
CPC .... H01R 13/46; H01R 13/516; H01R 13/627; H01R 13/633; H01R 13/648;
(Continued)

(56) References Cited

U.S. PATENT DOCUMENTS

| | | | | |
|---|---|---|---|---|
| 6,511,350 B1 * | 1/2003 | Ito | G06K 7/0021 | 439/377 |
| 6,540,560 B1 * | 4/2003 | Ito | H01R 13/2442 | 439/633 |

(Continued)

FOREIGN PATENT DOCUMENTS

CN 207303515 5/2018

*Primary Examiner* — Peter G Leigh
(74) *Attorney, Agent, or Firm* — Ming Chieh Chang; Wei Te Chung

(57) ABSTRACT

An electrical card connector includes an insulative housing defining a receiving space with a plurality of contacts retained therein with constant pitch thereof. The housing includes a base and a plurality of tongues extending from the base into the receiving space. The contact includes a contact arm extending forwardly into the receiving space, and a soldering leg extending rearwardly out of the base. The tongue includes a plurality of partition bars with corresponding cavities therebetween. The contacts include a plurality of differentia pairs and grounding contacts alternately arranged with each other. The partition bars are located between the neighboring grounding contacts and differential pairs while no partition bar is located within each differential pair.

20 Claims, 10 Drawing Sheets

(51) Int. Cl.

| | |
|---|---|
| ***H01R 13/405*** | (2006.01) |
| ***H01R 13/6471*** | (2011.01) |
| ***H01R 13/6581*** | (2011.01) |

(58) Field of Classification Search

CPC .. H01R 13/629; H01R 13/658; H01R 13/405; H01R 13/6471; H01R 13/6581; H01R 12/721; H01R 12/7005

USPC .......................................................... 439/64

See application file for complete search history.

(56) References Cited

U.S. PATENT DOCUMENTS

| | | | | | |
|---|---|---|---|---|---|
| 6,699,049 | B1 * | 3/2004 | Wu | H01R 12/725 | 439/79 |
| 6,767,252 | B2 * | 7/2004 | McGrath | H05K 1/117 | 439/637 |
| 7,459,985 | B2 * | 12/2008 | Mellitz | H05K 1/0224 | 333/5 |
| 7,585,184 | B2 * | 9/2009 | Su | H01R 13/567 | 439/579 |
| 7,794,232 | B2 * | 9/2010 | Ogatsu | G06K 13/0831 | 439/64 |
| 8,177,564 | B1 * | 5/2012 | Ito | H01R 13/6471 | 439/108 |
| 8,215,994 | B2 * | 7/2012 | Duenas | H01R 13/6471 | 439/637 |
| 8,254,135 | B2 * | 8/2012 | Shen | G06K 13/0831 | 361/737 |
| 8,342,886 | B2 * | 1/2013 | Zhang | H01R 12/7005 | 439/660 |
| 8,702,451 | B2 * | 4/2014 | Luo | H01R 12/725 | 439/607.28 |
| 8,992,262 | B2 * | 3/2015 | Pang | H01R 13/6471 | 439/626 |
| 9,276,342 | B2 * | 3/2016 | Masubuchi | H01R 13/6471 | |
| 9,281,590 | B1 * | 3/2016 | Liu | H01R 13/41 | |
| 9,337,585 | B1 * | 5/2016 | Yang | H01R 13/6471 | |
| 9,385,479 | B1 * | 7/2016 | Schmitt | H01R 13/6471 | |
| 9,560,760 | B2 * | 1/2017 | Wig | H05K 1/0216 | |
| 9,692,183 | B2 * | 6/2017 | Phillips | H01R 13/6471 | |
| 9,847,605 | B2 * | 12/2017 | Liao | H01R 43/18 | |
| 9,929,511 | B2 * | 3/2018 | Lynch | H01R 12/721 | |
| 9,991,652 | B2 * | 6/2018 | Tsai | H01R 13/6594 | |
| 10,038,281 | B2 * | 7/2018 | Wig | H01R 13/6471 | |
| 10,128,596 | B2 * | 11/2018 | Tsai | H01R 13/516 | |
| 10,164,379 | B2 * | 12/2018 | Duan | H01R 13/6585 | |
| 10,236,609 | B2 * | 3/2019 | Tziviskos | H01R 13/6594 | |
| 2008/0014803 | A1 * | 1/2008 | Kato | H01R 13/658 | 439/733.1 |
| 2011/0195602 | A1 * | 8/2011 | Wang | H01R 13/6582 | 439/607.22 |
| 2014/0141654 | A1 * | 5/2014 | Wig | H01R 13/6471 | 439/656 |
| 2015/0031240 | A1 * | 1/2015 | Yang | H01R 13/6471 | 439/607.08 |
| 2016/0308314 | A1 * | 10/2016 | Yu | H01R 24/60 | |
| 2018/0366862 | A1 * | 12/2018 | Zhao | H01R 13/41 | |

* cited by examiner

CARD CONNECTOR WITH FRAME-LIKE TONGUE FOR PROTECTING CANTILEVERED CONTACTS

BACKGROUND OF THE INVENTION

1. Field of the Invention

The present invention relates generally to an electrical card connector, and particularly to the card connector with frame like tongue protecting the cantilevered contact arms of the contacts.

2. Description of Related Arts

The card connector used in the mobile phone becomes smaller and smaller. The pitch and the width of the contacts of the card connector become smaller accordingly. Understandably, the partition bars formed by the housing of the connector may guidiably protect the neighboring contacts from the mechanical viewpoint. Anyhow, in some situation, the partition bar is unwelcome due to performance derived from the electrical transmission characteristics from the electrical viewpoint.

Hence, an electrical card connector with a reliable mechanical protection and a superior electrical performance is desired.

SUMMARY OF THE INVENTION

To achieve the above object, an electrical card connector includes an insulative housing defining a receiving space with a plurality of contacts retained therein with constant pitch thereof. The housing includes a base and a plurality of tongues extending from the base into the receiving space. The contact includes a contact arm extending forwardly into the receiving space, and a soldering leg extending rearwardly out of the base. The tongue includes a plurality of partition bars with corresponding cavities therebetween. The contacts include a plurality of differentia pairs and grounding contacts alternately arranged with each other. The partition bars are located between the neighboring grounding contacts and differential pairs while no partition bar is located between each differential pair. Instead, the contact arm is widened to occupy the internal space/gap between each differential pair.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
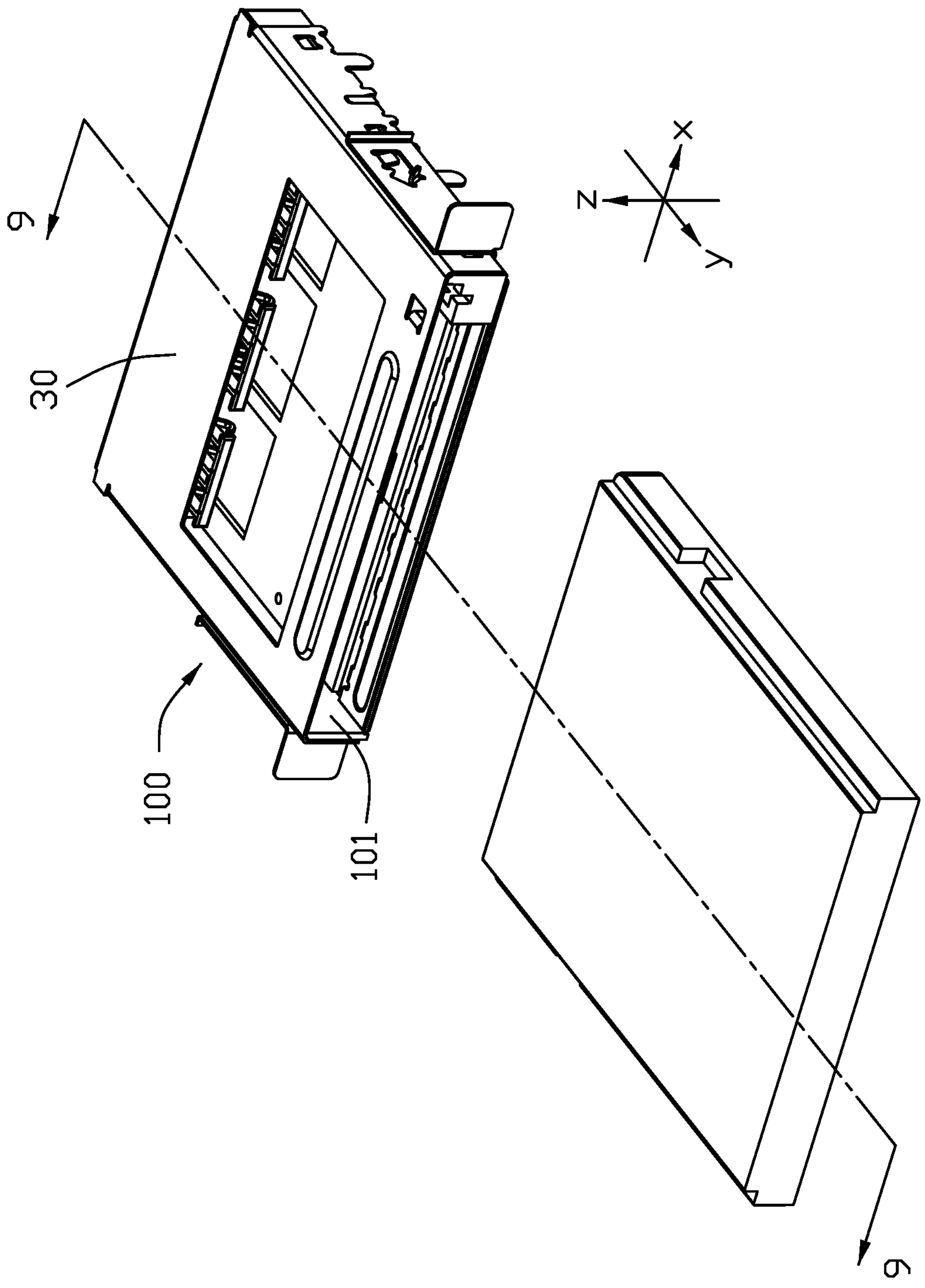
FIG. 1 is a perspective view of the electrical card connector and the corresponding electronic card of the present invention.
Figure 2:
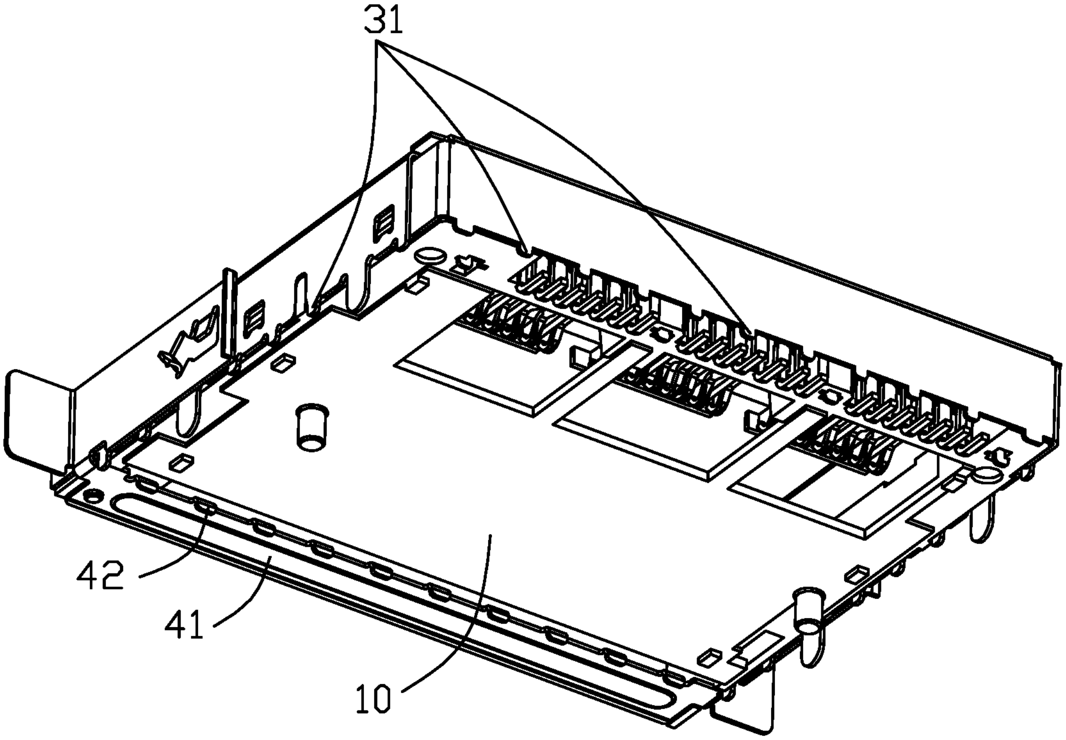
FIG. 2 is another perspective view of the electrical card connector and the corresponding electronic card of FIG. 1.
Figure 3:
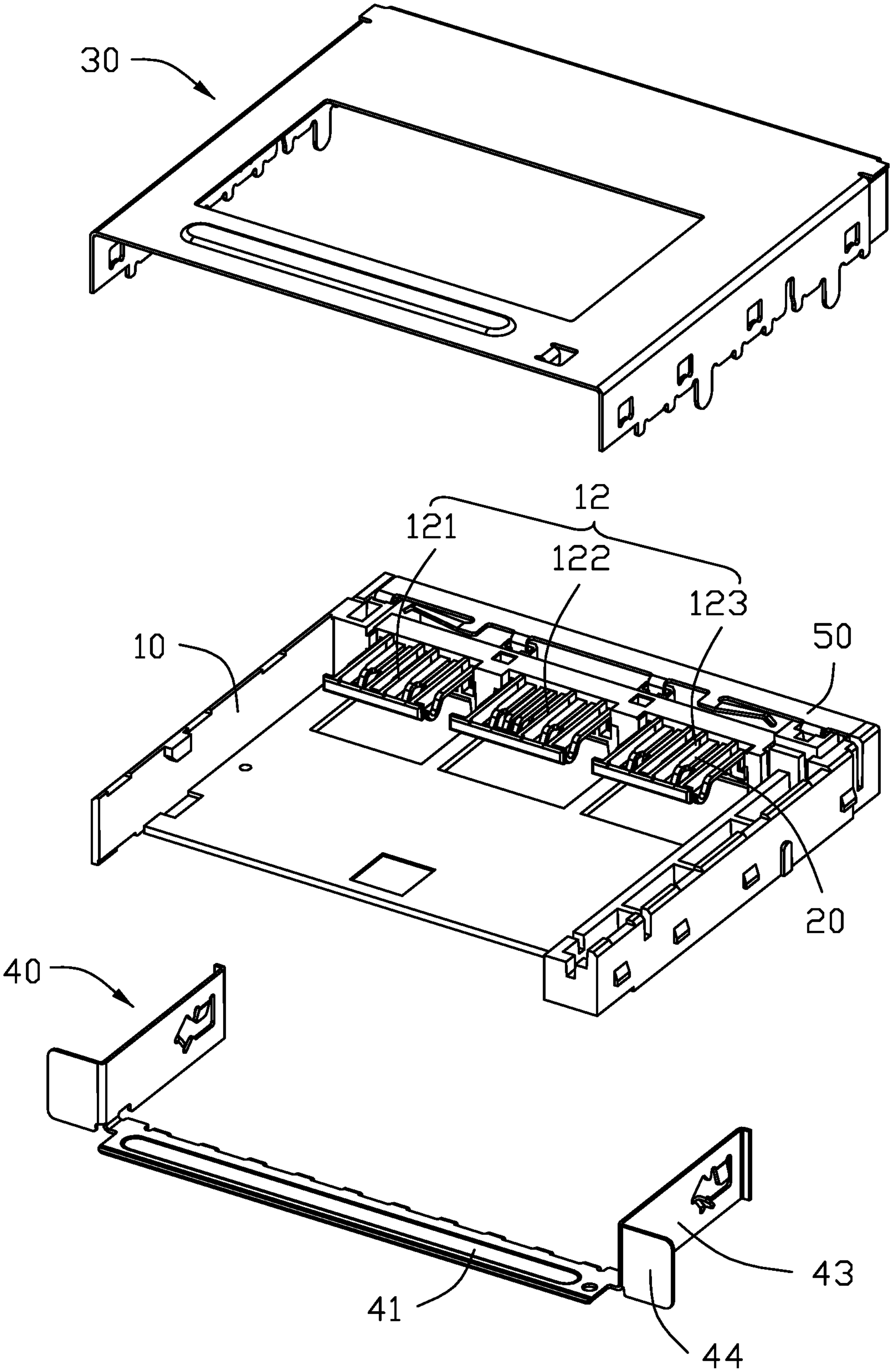
FIG. 3 is an exploded perspective view of the electrical card connector of FIG. 1.
Figure 4:
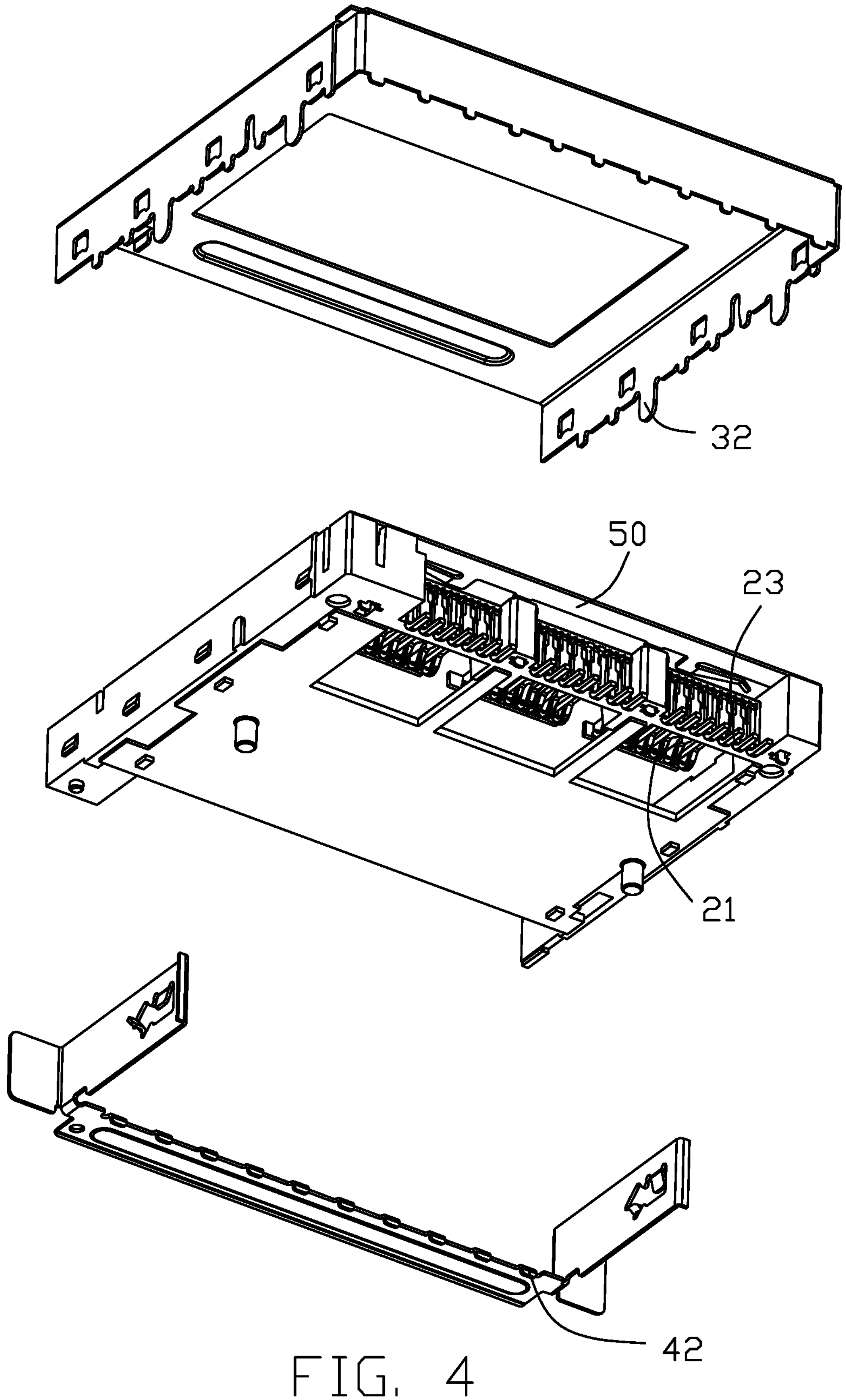
FIG. 4 is another exploded perspective view of the electrical card connector of FIG. 3.

Referring to FIGS. 1-10, an electrical card connector 100 for receiving an electronic card 200 therein. The connector 100 defines a receiving space 101 and includes an insulative housing 10, the contacts 20, a first shell 30, a second shell 40 and the grounding bar 50. The housing 10 includes a base/rear wall 11, a tongue sub-assembly 12 forwardly extending form the base 11 along the front-to-back direction and including a first tongue 121, a second tongue 122, and a third tongue 123 spaced from one another along a transverse direction in a same horizontal plane. The contacts 20 are categorize with the first set of contacts 20*a*, the second set of contacts 20*b* and the third set of contacts 20*c*.

The contact 20 includes a contact arm 22 exposed upon the tongue sub-assembly 12, a soldering leg 23 extending out of the base 11. The contact arm includes at a front end a contacting section 21 extending downwardly into the receiving space 101. The first set of contacts 20 includes a plurality of differential pairs S and grounding contacts G alternated arranged with each other in the transverse direction perpendicular to the front-to-back direction.

The first tongue 121 includes a plurality of forwardly extending partition bars 131 linked by a transverse bar 132. The partition bars 131 are located between the neighboring grounding contacts G and the differential pairs S. No partition bar is located between the differential pair S. Notably, the pitch among the first set of contacts 20*a* is constant while the contact arms 22 of the differential pair S are widened while the grounding contacts G are not. Because no partition bar is located between the differential pair internally, the width of the contact arms 22 can be significantly increased for electrical performance consideration. Similarly, the soldering leg 23 include a vertical section 231 and the horizontal section 232. The vertical sections 231 of the differential pair S are also widened while those of the grounding contacts G are not.

Figure 5:
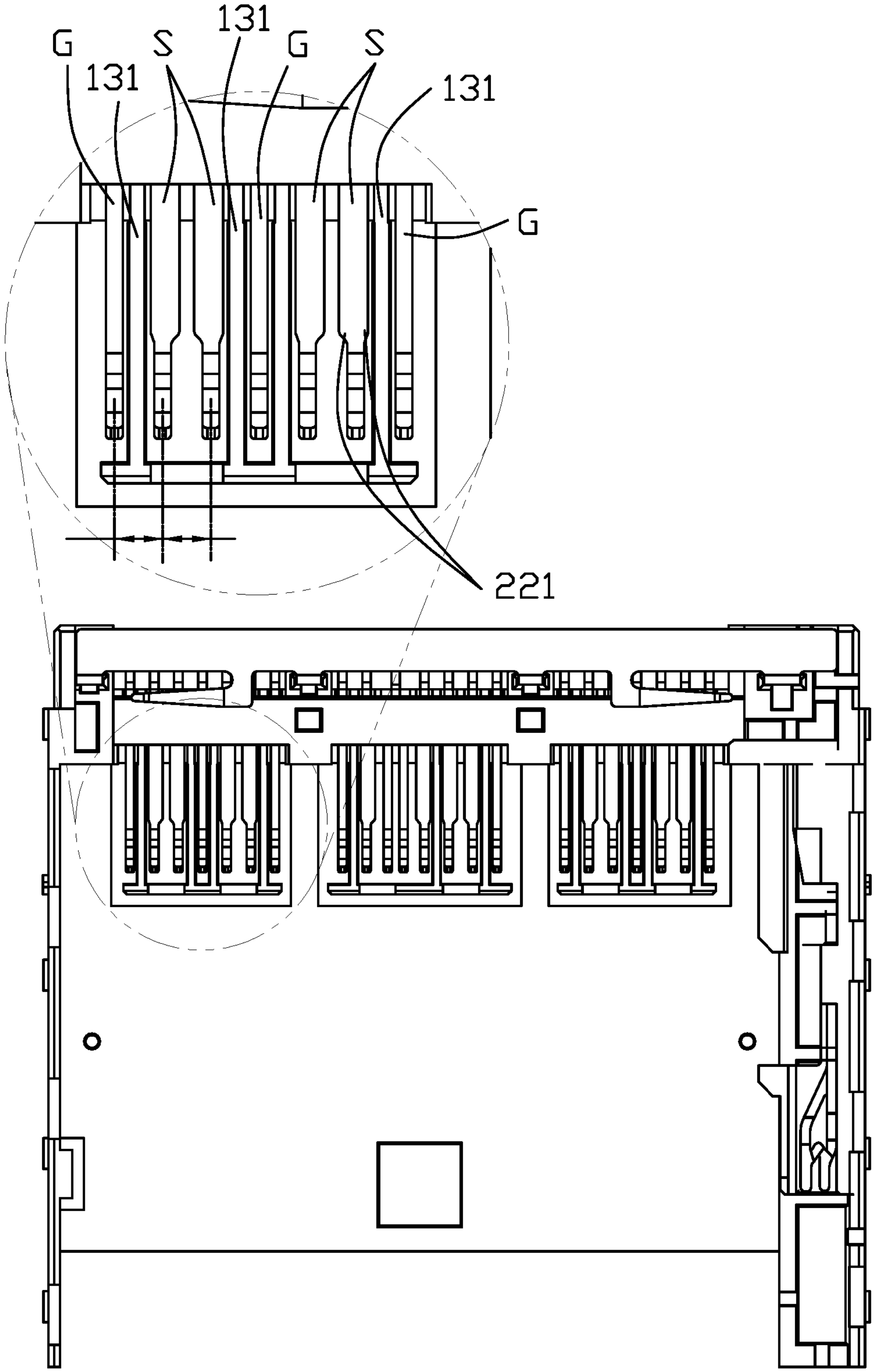
FIG. 5 is a top view of electrical card connector of FIG. 1.
Figure 6:
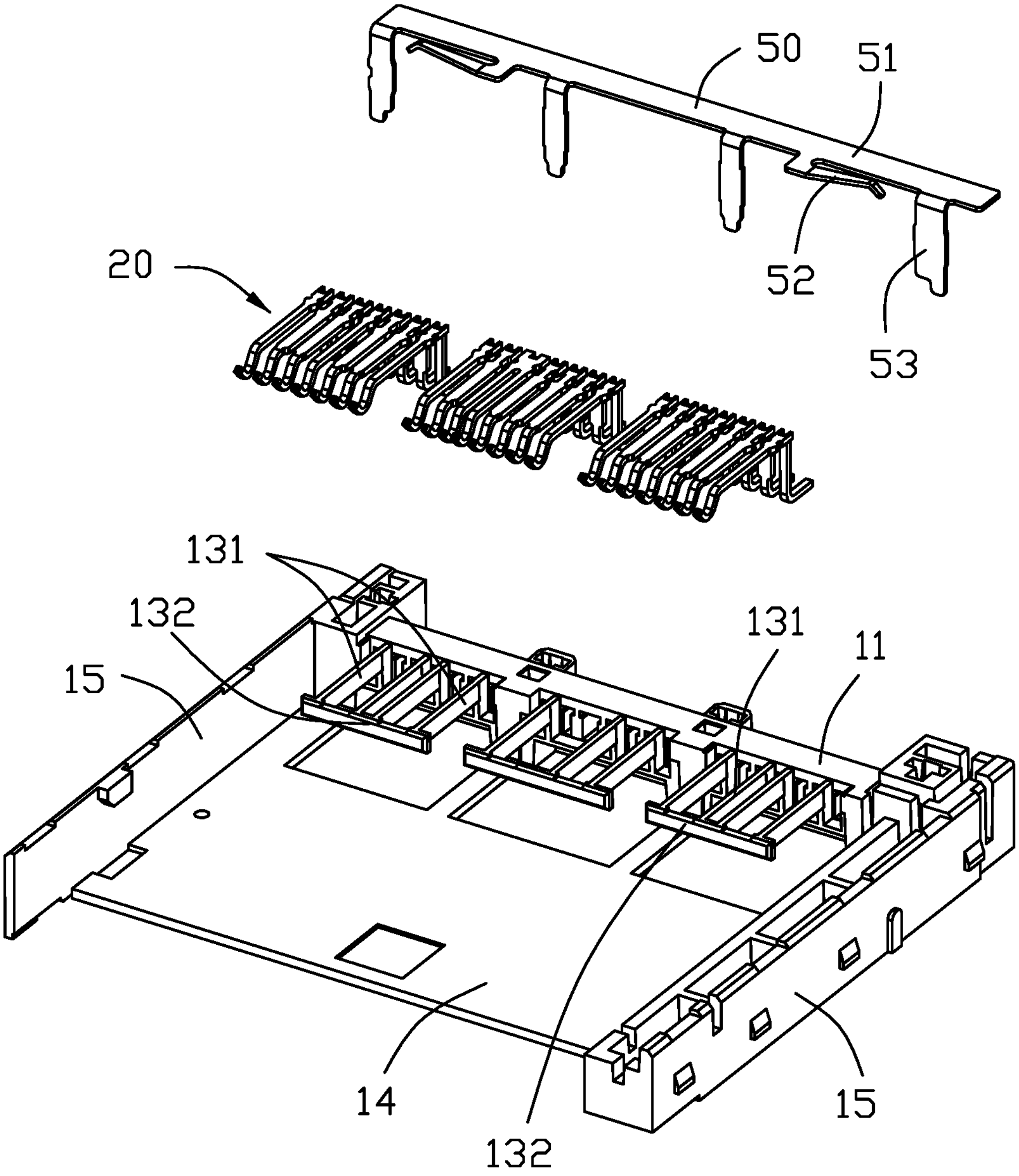
FIG. 6 is a further exploded view of the electrical card connector of FIG. 5.

As shown in FIG. 5, the first set of contacts 20*a* includes two differential pairs S alternately arranged with three grounding contacts G. The four partition bars 131 are only located between the neighboring grounding contacts G and the differential pairs S while no partition bar is located between/in each differential pair S.

The first set of contacts 20*a* and the third set of contacts 20*c* are same with each other, and the corresponding first tongue 121 and the third tongue 123 are same as well. Differently, the second set of contacts 20*b* has a widened power contact P and the second tongue 122 has only three partition bars.

The housing 10 includes a bottom wall 14 and a pair of side walls 15 respectively extending from the base/rear wall 11. A first shell 30 downwardly covers the base 11 and the pair of side walls 15. The grounding bar 50 is attached upon the top face of the base 11 with the spring tangs 52 mechanically and electrically connected to the first shell 30. The grounding bar 50 includes a main body 51, a plurality of grounding legs 53 extending through the base 11. The coupling between the grounding bar 50 and the first shell 30 may improve the EMI problem around the soldering legs 23.

The second shell 40 includes a bottom plate 41 located around the bottom wall 14 and having a plurality of abutting legs 42 for mounting to a printed circuit board. The second shell 40 further includes a pair side plates 43 attached upon the first shell 30, and a pair of mounting plates 44. The first shell 30, the second shell 40 and the housing 10 commonly form the complete receiving space 101. The first shell 30 further includes a plurality of abutting legs 31 cooperate with the abutting legs 42 of the second shell 40 to form grounding paths on the printed circuit board. The soldering legs 32 of the first shell 30 extend through the corresponding holes in the printed circuit board.

Figure 9:
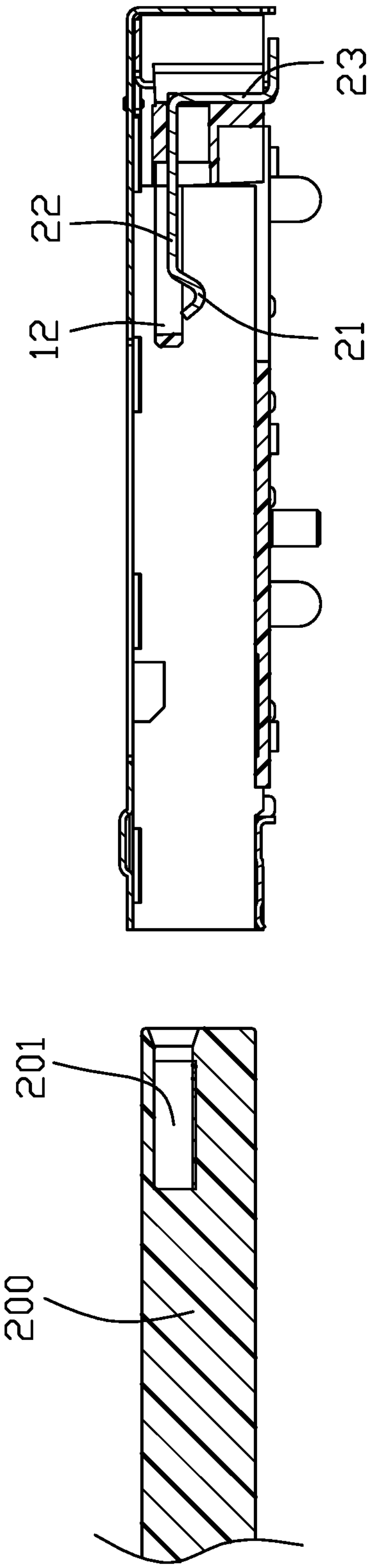
FIG. 9 is a cross-sectional view of the electronic card and the electrical card connector of FIG. 1.
Figure 10:
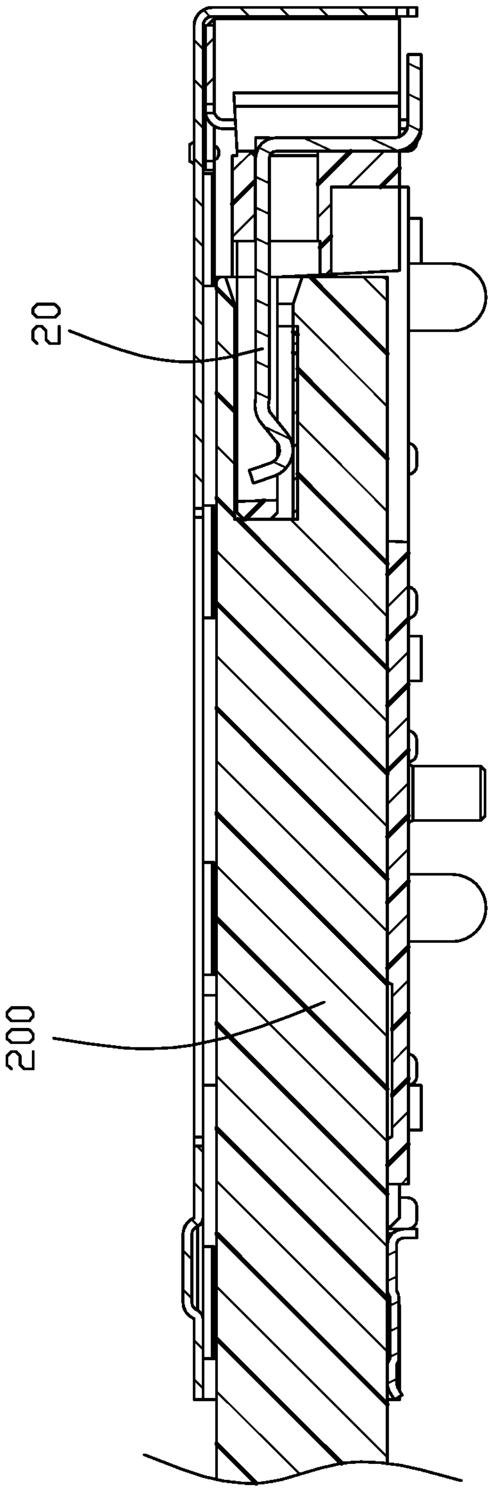
FIG. 10 is a cross-sectional view of the electronic card and the electrical card connector of FIG. 9 wherein the electronic card is inserted into the electrical card connector.

As shown in FIG. 9, the electronic card 200 includes a mating slot 201 to receive the tongue sub-assembly 12 so as to have the corresponding contacting sections 21 electrically and mechanically connected to the conductive pads (not shown) in the mating slot 201 of the electronic card 200.

Figure 7:
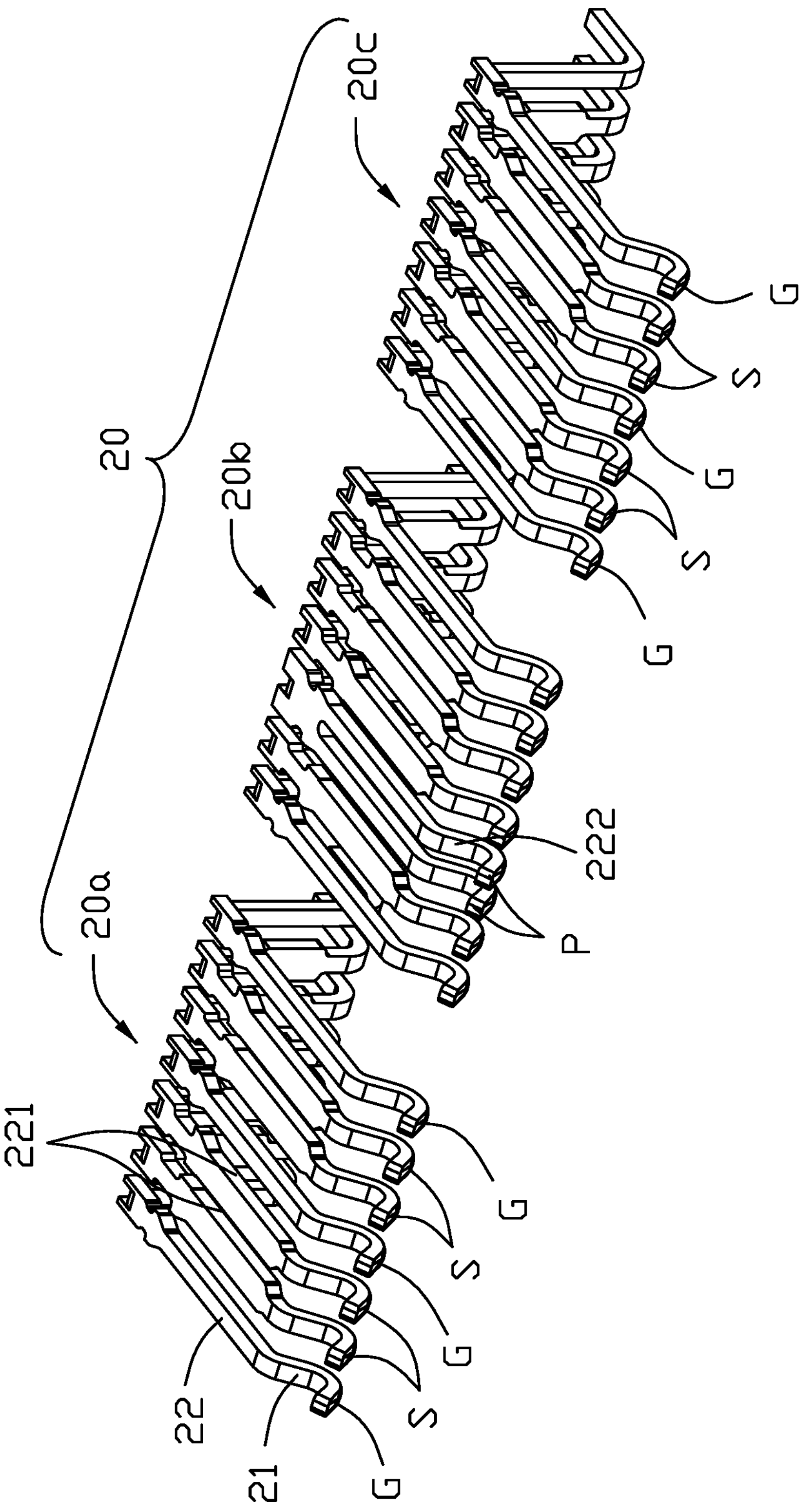
FIG. 7 is an exploded perspective view of the contacts of the electrical card connector of FIG. 1.
Figure 8:
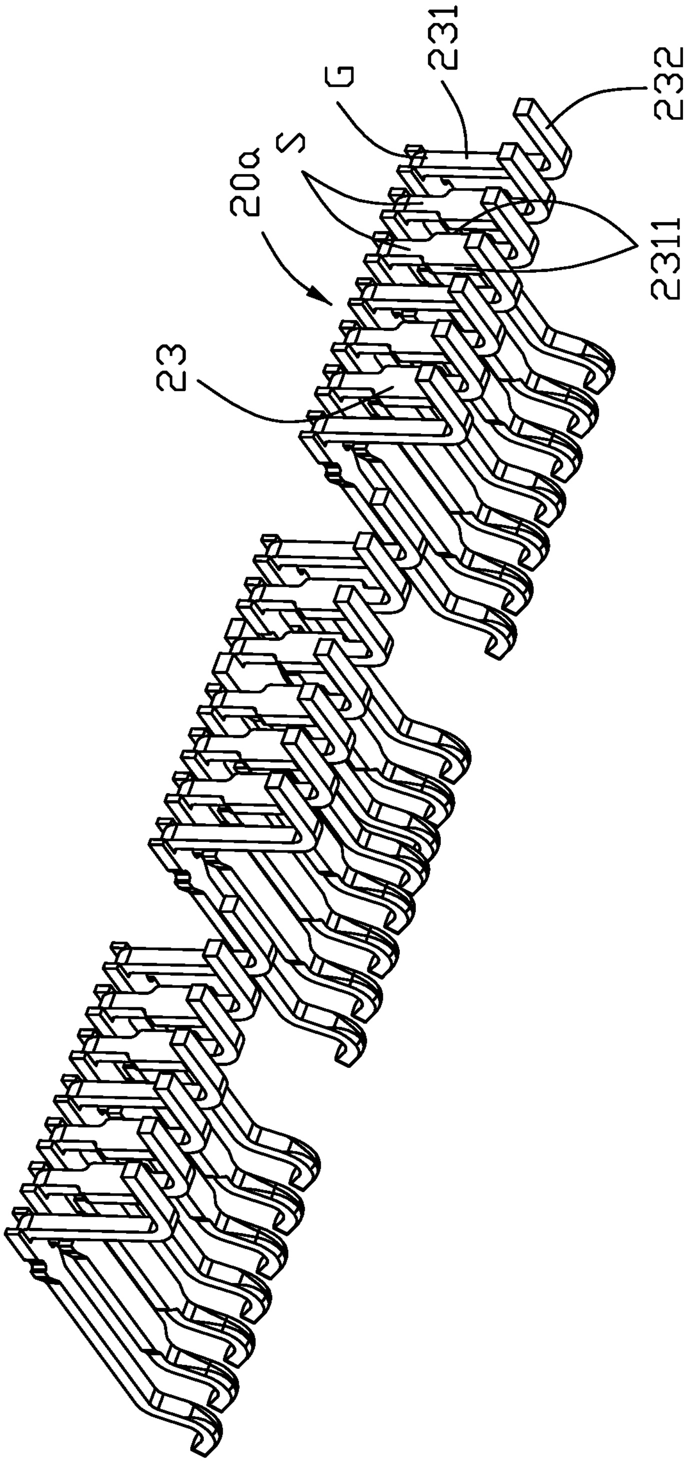
FIG. 8 is another exploded perspective view of the contacts of the electrical card connector of FIG. 7.

In this embodiment, as shown in FIG. 7, the barbs of the differential pair S are located in front of those of the grounding contacts G so as to avoid the excessive deformation of the base 11 along the same transverse direction. In addition, the bottom wall 14 includes three openings (not labeled) in alignment with the corresponding first tongue 121, second tongue 122 and third tongue 123 for molding consideration. Understandably, the tongue sub-assembly 12 only provide the protection along the transverse direction and the front-to-back direction while stilling opening in the vertical direction for heat dissipation consideration.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. An electrical connector for use with an electronic card, comprising:

an insulative housing defining a receiving space and including at least a rear wall behind the receiving space in the front-to-back direction, and at least one tongue forwardly extending from the rear wall in said front-to-back direction, said tongue including a plurality of partition bars extending along the front-to-back direction;

a plurality of contacts retained to the rear wall and including a plurality of differential pairs and a plurality of grounding contacts alternately arrange with each other in a transverse direction perpendicular to the front-to-back direction, each of said contacts including a deflectable contact arm extending forwardly from the rear wall, and a leg exposed outside of rear wall, a contacting section formed at a front end of the contact arm and protruding in a vertical direction perpendicular to the front-to-back direction and the transverse direction; wherein the partition bars are located between, along the transverse direction, the neighboring grounding contact and differential pair only, and no partition bar is located in each differential pair.

2. The electrical connector as claimed in claim 1, wherein the tongue further includes a transverse bar unitarily linked at front ends of said partition bars for reinforcement.

3. The electrical connector as claimed in claim 2, wherein the tongue protects the contacts in the transverse direction and the front-to-back direction while keeping open in the vertical direction for heat dissipation.

4. The electrical connector as claimed in claim 1, wherein a pitch of the contacting sections of said contacts is constant.

5. The electrical connector as claimed in claim 4, wherein a width of the contact arms of the differential pair are widened compared with those of the grounding contacts.

6. The electrical connector as claimed in claim 1, wherein the housing further includes a bottom wall forwardly extending from the rear wall and located under the receiving space, and said bottom wall forms a through opening in alignment with the tongue in the vertical direction.

7. The electrical connector as claimed in claim 6, wherein the tongue is spaced from the bottom wall in the vertical direction.

8. The electrical connector as claimed in claim 7, wherein the contacting section protrudes toward the bottom wall in the vertical direction.

9. The electrical connector as claimed in claim 6, further including a metallic shell including a horizontal plate located in front of the bottom wall in coplanar manner for guiding insertion of the electronic card into the receiving space.

10. The electrical connector as claimed in claim 1, wherein retaining barbs of the differential pair is offset from those of the grounding contacts in the front-to-back direction.

11. The electrical connector as claimed in claim 1, further including a metallic shell covering a top face of the rear wall, and a grounding bar is sandwiched between the shell and the rear wall in the vertical direction, and said grounding bar includes a plurality of grounding legs extending through the rear wall.

12. An electrical connector assembly comprising:

a card connector and an electronic card adapted to be received within the card connector;

the card connector including:

an insulative housing defining a receiving space and including at least a rear wall behind the receiving space in the front-to-back direction, a bottom wall forwardly extending from the rear wall and located under the receiving space, and at least one tongue forwardly extending from the rear wall in said front-to-back direction, said tongue including a plurality of partition bars extending along the front-to-back direction;

a plurality of contacts retained to the rear wall and including a plurality of differential pairs and a plurality of grounding contacts alternately arrange with each other in a transverse direction perpendicular to the front-to-back direction, each of said contacts including a deflectable contact arm extending forwardly from the rear wall, and a leg exposed outside of rear wall, a contacting section formed at a front end of the contact arm and protruding in a vertical direction perpendicular to the front-to-back direction and the transverse direction; wherein the partition bars are located between the contacts, respectively; wherein the electronica card forms a mating slot receiving the tongue and the contact arms positioned in the tongue; wherein a metallic shell covers the insulative housing and includes a plurality of abutting legs surrounding the bottom wall.

13. The electrical connector assembly as claimed in claim 12, wherein the tongue further includes a transverse bar linked at front ends of the partition bars for reinforcement.

14. The electrical connector assembly as claimed in claim 12, wherein the partition bars are located between the neighboring grounding contacts and the differential pairs but not located in each differential pair internally.

15. The electrical connector assembly as claimed in claim 14, wherein the contact arms of the differential pair are widened in the transverse direction while those of the grounding contacts keep a same width with the contacting sections.

16. The electrical connector assembly as claimed in claim 12, wherein the bottom wall forms a through opening in alignment with the tongue in the vertical direction.

17. An electrical card connector for use with an electronic card, comprising:

an insulative housing defining a receiving space and including at least a rear wall behind the receiving space in the front-to-back direction, and at least one tongue forwardly extending from the rear wall in said front-to-back direction, said tongue including a plurality of partition bars extending along the front-to-back direction, and a transvers bar linked at front ends of the partition bars in a transvers direction perpendicular to the front-to-back direction;

a plurality of contacts retained to the rear wall and including a plurality of differential pairs and a plurality of grounding contacts alternately arrange with each other in said transverse direction, each of said contacts including a deflectable contact arm extending forwardly from the rear wall, and a leg exposed outside of rear wall, a contacting section formed at a front region of the contact arm and protruding in a vertical direction perpendicular to the front-to-back direction and the transverse direction; wherein the partitions bars extending forwards from the rear wall and are respectively located between the neighboring contacts in the transverse direction for protection in the transverse direction; and the transverse bar is linked at front ends of the partition bars and remaining portions of the neighboring partition bars are spaced from each other without connection in the transverse direction for allowing up-and-down deflection of the contact arms, so that the transverse bar is located in front of the contact arms for insertion protection along the front-to-back direction; wherein a front end of the contacting section is free from the transverse bar in the front-to-back direction for allowing upward deflection of the corresponding contacting arm during mating with the electronic card.

18. The electrical card connector as claimed in claim 17, wherein the housing further includes a bottom wall unitarily extending from the rear wall and under the receiving space, and said bottom walls forms a through opening aligned with the tongue in the vertical direction.

19. The electrical card connector as claimed in claim 17, wherein each of the partition bars is only located between the neighboring grounding contact and differential pair, and no partition bar is located within the differential pair.

20. The electrical card connector as claimed in claim 19, wherein the contact arms of the differential pairs are widened in the transverse direction while those of the grounding contacts are not.

* * * * *